(12) United States Patent
Shibata

(10) Patent No.: US 11,444,297 B2
(45) Date of Patent: Sep. 13, 2022

(54) MANUFACTURING METHOD FOR GAS DIFFUSION SHEET

(71) Applicant: TOYOTA JIDOSHA KABUSHIKI KAISHA, Toyota (JP)

(72) Inventor: Yukihiro Shibata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 38 days.

(21) Appl. No.: 16/551,897

(22) Filed: Aug. 27, 2019

(65) Prior Publication Data

US 2020/0119374 A1    Apr. 16, 2020

(30) Foreign Application Priority Data

Oct. 11, 2018 (JP) .............................. JP2018-192438

(51) Int. Cl.
| | |
|---|---|
| *H01M 8/04119* | (2016.01) |
| *H01M 8/1018* | (2016.01) |
| *H01M 8/023* | (2016.01) |
| *H01M 8/14* | (2006.01) |

(52) U.S. Cl.
CPC ....... *H01M 8/04149* (2013.01); *H01M 8/023* (2013.01); *H01M 8/1018* (2013.01); *H01M 8/141* (2013.01)

(58) Field of Classification Search
None
See application file for complete search history.

(56) References Cited

U.S. PATENT DOCUMENTS

| | | | |
|---|---|---|---|
| 2016/0181644 A1 | 6/2016 | Ohashi et al. | |
| 2018/0264501 A1* | 9/2018 | Watanabe | ............. B05C 1/0821 |
| 2018/0375106 A1* | 12/2018 | Tanimura | ................ H01M 8/10 |

FOREIGN PATENT DOCUMENTS

| | | |
|---|---|---|
| CN | 101402423 A | 4/2009 |
| JP | 2007098186 A | 4/2007 |
| JP | 2009191378 A | 8/2009 |
| JP | 2015221949 A | 12/2015 |
| JP | 2016115493 A | 6/2016 |
| JP | 2017103169 A | 6/2017 |

* cited by examiner

*Primary Examiner* — Alix E Eggerding
(74) *Attorney, Agent, or Firm* — Dickinson Wright, PLLC

(57) ABSTRACT

In a manufacturing method for a gas diffusion sheet, when a first film is joined to a front end portion of a base material in a conveyance direction, a first joining material is made to penetrate a first overlapping portion where the first film and the base material are superimposed on each other, and the first film and the base material are thus joined to each other physically through the first joining material. When a second film is joined to a rear end portion of the base material in the conveyance direction, a second joining material is made to penetrate a second overlapping portion where the base material and the second film are superimposed on each other, and the base material and the second film are thus physically joined to each other through the second joining material.

9 Claims, 7 Drawing Sheets

MANUFACTURING METHOD FOR GAS DIFFUSION SHEET

INCORPORATION BY REFERENCE

The disclosure of Japanese Patent Application No. 2018-192438 filed on Oct. 11, 2018 including the specification, drawings and abstract is incorporated herein by reference in its entirety.

BACKGROUND

1. Technical Field

The disclosure relates to a manufacturing method for a gas diffusion sheet of a fuel cell. In the manufacturing method, a porous layer containing conductive particles is formed on a conductive belt-shaped base material while the base material is conveyed by a roll-to-roll method.

2. Description of Related Art

A method is proposed in which a surface of a base material is coated with a coating liquid or a coating paste material while the base material is conveyed by a roll-to-roll method. For example, according to a technique described in Japanese Unexamined Patent Application Publication No. 2007-98186 (JP 2007-98186 A), an unwinding roll and a winding roll are provided. The unwinding roll unwinds a belt-shaped base material that is wound in a roll shape, and the winding roll winds the unwound base material. Then, the base material is conveyed by the roll-to-roll method, and the paste material is applied on the base material passing a conveyance path, and then dried by heating.

When the base material is conveyed, a film may be adhered to a distal end of the base material in a conveyance direction, which is an unwinding start part of the base material, by using adhesive tape or the like as described in Japanese Unexamined Patent Application Publication No. 2016-115493 (JP 2016-115493 A). When the base material is conveyed, the film adhered to the base material is conveyed to the winding roll. Thus, while the belt-shaped base material is conveyed, it is possible to guide the conveyed base material to the winding roll.

SUMMARY

However, when the coating method described in JP 2007-98186 A is carried out with the use of the film described in JP 2016-115493 A, since the film and the base material are conveyed by the roll-to-roll method, tension acts not only on the film and the base material, but also on a joining part between the film and the base material. Here, the paste material coating the base material is heated for drying. Since the joining part between the film and the base material is heated while tension is acting on it during the conveyance, the film and the base material in the joining part can be misaligned.

The disclosure provides a manufacturing method in which a gas diffusion sheet of a fuel cell is manufactured while a film and a base material are being conveyed by a roll-to-roll method in a state where a joining strength of the film and the base material is enhanced.

A manufacturing method for a gas diffusion sheet according to the disclosure is a manufacturing method for a gas diffusion sheet of a fuel cell. In this manufacturing method, a porous layer containing a conductive particle is formed on a conductive belt-shaped base material while the base material is conveyed by a roll-to-roll method. The manufacturing method includes joining a first film for conveyance to a front end portion of the base material in a conveyance direction, the front end portion serving as an unwinding start part of the base material that is wound in a roll shape, guiding the base material while the base material is conveyed as the first film is conveyed by the roll-to-roll method, and coating a surface of the base material with a paste material that contains at least a conductive particle, manufacturing the gas diffusion sheet as the porous layer is formed as the paste material applied is heated while the base material coated with the paste material is continuously conveyed, and joining a second film for conveyance to a rear end portion of the base material in the conveyance direction, the rear end portion serving as an unwinding end part of the base material. After the first film is wound, the gas diffusion sheet joined to the first film is wound, and further, the second film joined to the gas diffusion sheet is wound. For joining of the first film, a first joining material is made to penetrate a first overlapping portion where the first film and the base material are superimposed on each other, and the first film and the base material are thus physically joined to each other through the first joining material. For joining of the second film, a second joining material is made to penetrate a second overlapping portion where the base material and the second film are superimposed on each other, and the second film and the base material are thus physically joined to each other through the second joining material.

According to the disclosure, the first film for conveyance is joined to the front end portion of the base material in the conveyance direction, the front end portion serving as the unwinding start part of the base material that is wound in a roll shape. At this time, the first joining material is made to penetrate the first overlapping portion where the first film and the base material are superimposed on each other, and the first film and the base material are thus physically joined to each other through the first joining material. Thus, joining strength of the first film and the base material is enhanced compared to a case where the first film and the base material are joined to each other only with adhesive tape, pressure-sensitive adhesive tape, or the like.

Similarly, the second film for conveyance is joined to the rear end portion of the base material in the conveyance direction, the rear end portion serving as the unwinding end part of the base material. At this time, the second joining material is made to penetrate the second overlapping portion where the base material and the second film are superimposed on each other, and the second film and the base material are thus physically joined to each other through the second joining material. Thus, joining strength of the base material and the second film is enhanced compared to a case where the base material and the second film are joined to each other only with adhesive tape, pressure-sensitive adhesive tape, or the like.

As a result, even when a joining part of the first film and the base material and a joining part of the base material and the second film are heated while tension is acting on these joining parts, it is possible to prevent misalignment of the first film and the base material and misalignment of the base material and the second film. Thus, it is possible to coat the conveyed base material with the paste material and dry the paste material applied in a stable manner.

As long as the base material and the first film are joined to each other without misalignment, and the base material and the second film are joined to each other without misalignment, the base material and the first film, and the base material and the second film may be joined to each other with the physical joining alone. However, as another aspect, the first film and the base material may be adhered to each other through a first adhesive when the first film and the base material are superimposed on each other so as to join the first film. Also, the base material and the second film may be adhered to each other through a second adhesive when the base material and the second film are superimposed on each other so as to join the second film.

In this aspect, when the first film and the base material are superimposed on each other, the first film and the base material are adhered to each other through the first adhesive. Therefore, it is possible to physically join the first film and the base material with the first joining material in a state where the first film and the base material are held at appropriate positions, respectively. Similarly, the base material and the second film are adhered to each other through the second adhesive when the base material and the second film are superimposed on each other. Therefore, it is possible to physically join the base material and the second film in a state where the base material and the second film are held at appropriate positions, respectively.

Further, as long as the first film and the base material are adhered to each other by the first adhesive in the state where the first film and the base material are superimposed on each other, and the base material and the second film are adhered to each other by the second adhesive in the state where the base material and the second film are superimposed on each other, then the first adhesive and the second adhesive may be applied as they are, and adhesion states of the first adhesive and the second adhesive are not particularly limited. However, as another aspect, the first film and the base material may be adhered to each other through a first adhesive sheet when the first film and the base material are superimposed on each other so as to join the first film. The first adhesive sheet has the first adhesive applied on both sides of the first adhesive sheet. Then, the first joining material may be made to penetrate the first overlapping portion as well as the first adhesive sheet so that the first film and the base material are joined to each other. Further, the base material and the second film may be adhered to each other through a second adhesive sheet when the base material and the second film are superimposed on each other so as to join the second film. The second adhesive sheet has the second adhesive applied on both sides of the second adhesive sheet. Then, the second joining material may be made to penetrate the second overlapping portion as well as the second adhesive sheet so that the second film and the base material are joined to each other.

According to this aspect, the first film and the base material are joined to each other as the first joining material is made to penetrate the first overlapping portion as well as the first adhesive sheet having the adhesive applied on both surfaces of the first adhesive sheet. Therefore, the first adhesive sheet is able to reinforce portions of the base material and the first film where the first joining material passes through. The base material and the second film are joined to each other as the second joining material is made to penetrate the second overlapping portion as well as the second adhesive sheet having the adhesive applied on both surfaces of the second adhesive sheet. Therefore, the second adhesive sheet is able to reinforce portions of the base material and the second film where the second joining material passes through. The adhesive sheet in the disclosure includes a pressure-sensitive adhesive sheet in which a pressure-sensitive adhesive is applied on a sheet material.

According to the disclosure, it is possible to manufacture a gas diffusion sheet of a fuel cell while a first film, a base material, and a second film are conveyed by a roll-to-roll method in a state where joining strength of the first film and the base material and joining strength of the base material and the second film are enhanced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, with reference to FIG. 1 to FIG. 8B, a manufacturing method for a gas diffusion sheet of a fuel cell according to an embodiment of the disclosure is described.

1. Regarding a Gas Diffusion Sheet 10

Figure 2:
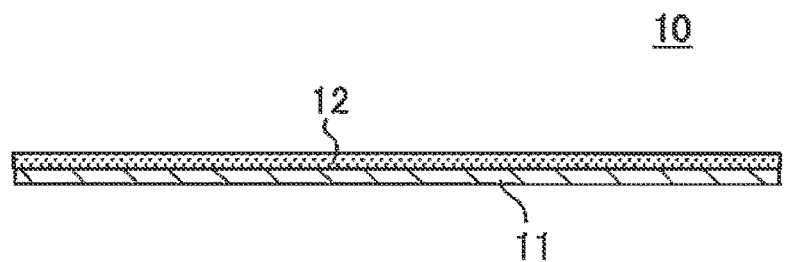
FIG. 2 is a sectional view of the gas diffusion sheet according to the embodiment.
Figure 3:
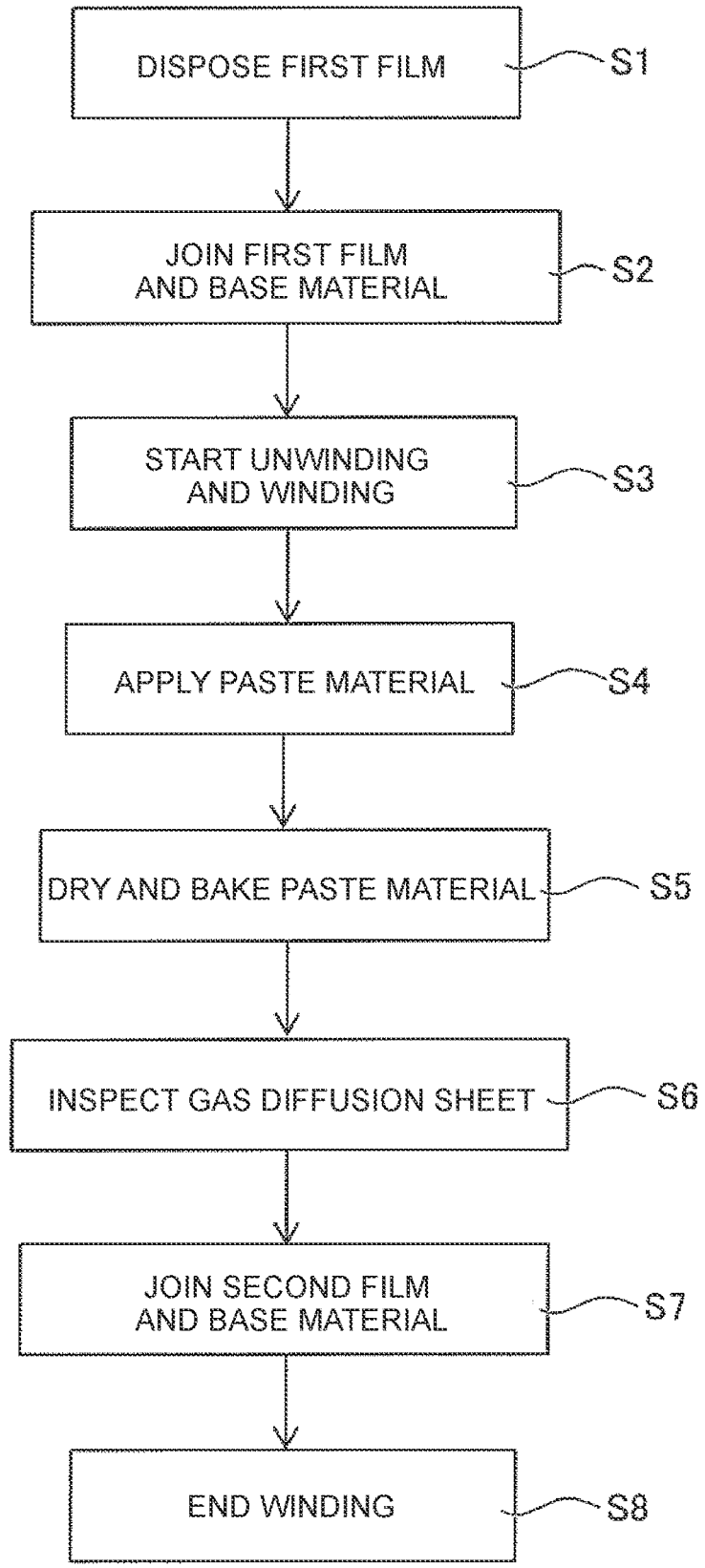
FIG. 3 is a flowchart of a manufacturing method for the gas diffusion sheet.

As shown in FIG. 2, the gas diffusion sheet 10 according to the embodiment is a sheet material in which a porous layer (a microporous layer) 12 is formed on a base material 11. The gas diffusion sheet 10 serves as a gas diffusion layer by being laminated on both surfaces of a membrane electrode assembly (not shown and also referred to as an MEA) that constructs a single cell of a fuel cell.

After the gas diffusion layer is laminated on both surfaces of the membrane electrode assembly, a resultant laminated body is sandwiched by a pair of separators. Thus, a cell for a fuel cell is constructed as a power generation part of the fuel cell. The membrane electrode assembly is made of an ion-permeable electrolyte film, and an anode-side catalyst layer (an electrode layer) and a cathode-side catalyst layer (an electrode layer) that sandwich the electrolyte film. The electrolyte film is a proton-conductive ion exchange film made from a solid polymer material, and each of the catalyst layers is a porous layer in which a catalyst such as platinum is supported on carbon particles and bound by an ionomer.

The gas diffusion layer on a first side is joined to the anode-side catalyst layer. The gas diffusion layer on a second side is joined to the cathode-side catalyst layer. A base material of each of the gas diffusion layers is made from, for example, a carbon porous material such as carbon paper or carbon cloth. The foregoing porous layer containing the conductive particles is formed on the base material of the gas diffusion layer.

The porous layer is joined to the catalyst layer.

Here, fuel gas such as hydrogen gas is supplied from the separator to the gas diffusion layer on the first side, and oxidizer gas such as atmosphere is supplied from the separator to the gas diffusion layer on the second side. As the fuel gas and the oxidizer gas are supplied, electrochemical reaction occurs inside an MEA, and the fuel cell generates power.

2. Regarding a Manufacturing Device 30 for the Gas Diffusion Sheet 10

Figure 1:
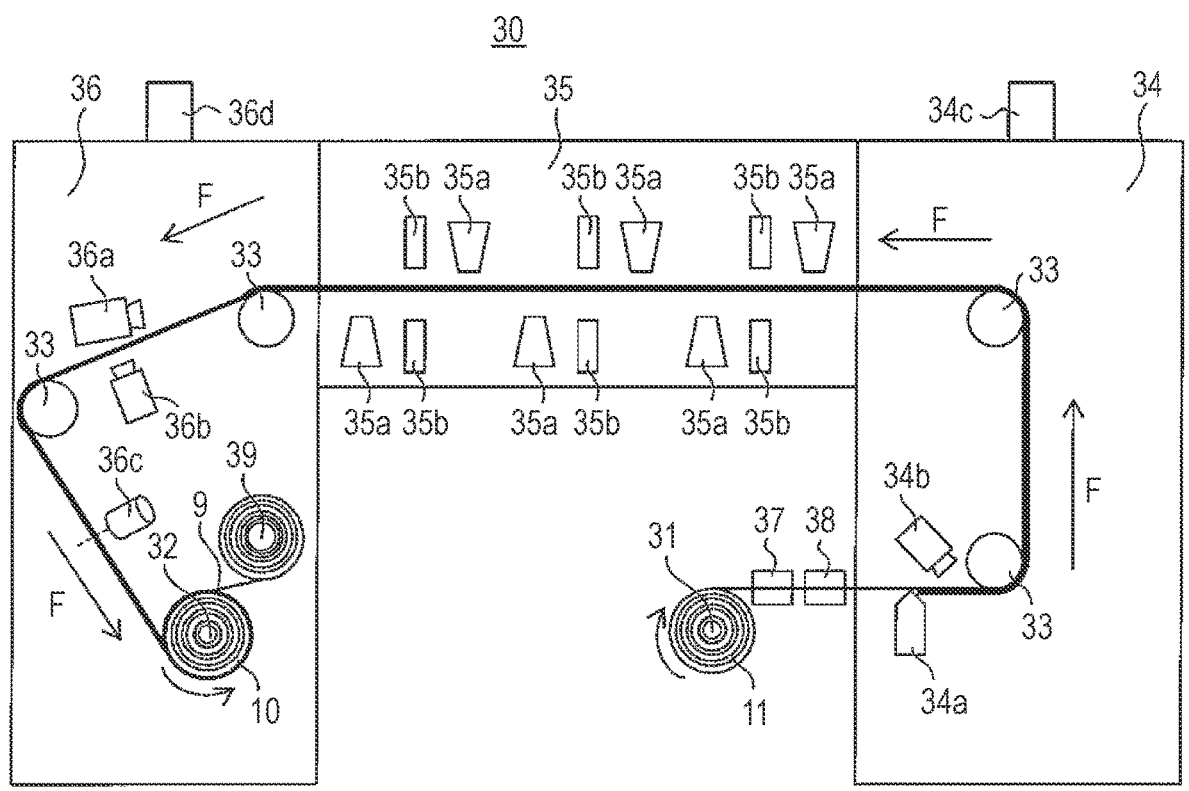
FIG. 1 is a schematic view of a manufacturing device for a gas diffusion sheet of a fuel cell according to an embodiment.

In the embodiment, the gas diffusion sheet 10 used as the gas diffusion layer of the fuel cell described above is manufactured by using the manufacturing device 30 described below. Specifically, as shown in FIG. 1, the manufacturing device 30 includes an unwinding roll 31 and a winding roll 32. The unwinding roll 31 unwinds the base material 11 that is wound in a roll shape. The winding roll 32 winds the base material 11 on which the porous layer 12 is formed (in other words, the gas diffusion sheet 10) in a roll shape. A plurality of convey rolls 33 is disposed in a conveyance path of the base material 11.

Due to the winding by the winding roll 32, it is possible to convey the base material 11 by a roll-to-roll method while given tension is applied to the base material 11. Interleaving paper unwound from an interleaving paper roll 39 is wound on the winding roll 32 together with the gas diffusion sheet 10.

The manufacturing device 30 includes a coating part 34, a drying and baking part 35, and an inspection part 36. In a coating part 34, a paste material is applied on the base material 11. In the drying and baking part 35, the porous layer 12 is formed on the base material 11 as the paste material applied on the base material 11 is dried and baked. In the inspection part 36, the base material 11 on which the porous layer 12 is formed (the gas diffusion sheet 10) is inspected.

In the coating part 34, a coating device 34a is disposed that applies the paste material onto the base material 11 unwound from the unwinding roll 31, and an inspection camera 34b is disposed on an opposite side of the base material 11 from the coating device 34a. The inspection camera 34b checks an impregnation status of the base material 11 with the paste material. Further, in the coating part 34, an exhaust part 34c is provided that discharges air inside the coating part 34.

The drying and baking part 35 includes a plurality of nozzles 35a and a plurality of radiation thermometers 35b. The nozzles 35a blow hot air onto the base material 11 in order to heat the paste material applied in the coating part 34, together with the base material 11. The radiation thermometers 35b measure temperature of the base material 11 and so on. The nozzles 35a are arrayed along a conveyance direction of the base material 11 so that the nozzles 35a blow hot air onto both surfaces of the base material 11, and the radiation thermometers 35b are disposed close to the nozzles 35a, respectively.

The inspection part 36 includes an inspection camera 36a, an inspection camera 36b, and a printing device 36c. The inspection camera 36a inspects the porous layer 12 formed on the base material 11, and the inspection camera 36b inspects a back surface of the base material 11. The printing device 36c prints on a defect portion of the base material 11 based on results from the inspection cameras 36a, 36b. Further, in the inspection part 36, an exhaust part 36d is provided that discharges air inside the inspection part 36.

Further, a joining device 37 is disposed between the unwinding roll 31 and the coating part 34. The joining device 37 joins a later-described first film 21A and the base material 11, and also joins the base material 11 and a second film 21B. Further, a dust collector 38 is disposed between the joining device 37 and the coating part 34. The dust collector 38 collects foreign matters attached to the base material 11 and so on.

3. With regard to a manufacturing method for the gas diffusion sheet 10 In the embodiment, the gas diffusion sheet 10 of the fuel cell is manufactured by forming the porous layer 12 containing the conductive particles on the conductive belt-shaped base material 11 while the base material 11 is conveyed by the roll-to-roll method. Specifically, the gas diffusion sheet 10 is manufactured with reference to the flowchart shown in FIG. 3, as well as FIG. 4A and FIG. 4B.

In the embodiment, first of all, in step S1, the first film 21A for the conveyance is prepared and disposed along the conveyance path in the manufacturing device 30. Here, the first film 21A is a resin film made from, for example, polyester resin, polypropylene resin, polyimide resin, and polyvinylidene chloride resin. After a front end portion of the belt-shaped first film 21A in the conveyance direction F is passed in the coating part 34, the drying and baking part 35, and the inspection part 36 in this order, a part of the first film 21A is wound on the winding roll 32. Then, the first film 21A is continuously wound on the winding roll 32 until a rear end portion of the first film 21A in the conveyance direction F is positioned in the joining device 37.

Figure 4A:
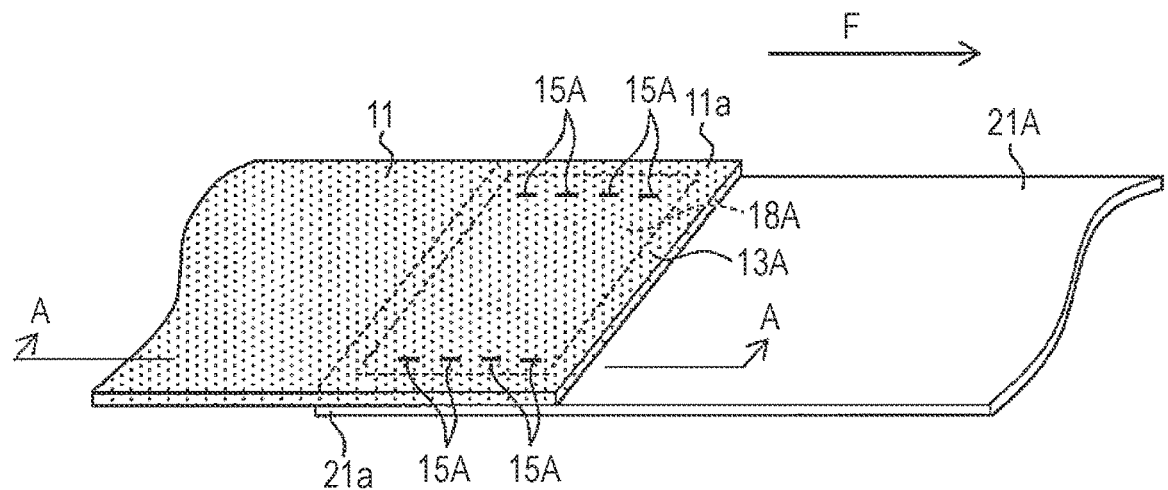
FIG. 4A is a view describing joining of a first film and a base material.
Figure 4B:
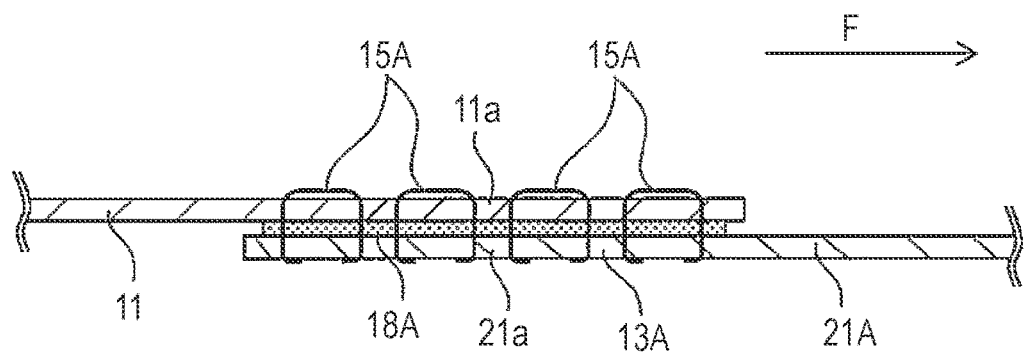
FIG. 4B is a sectional view taken along arrows A-A in FIG. 4A.

Next, as shown in step S2, the first film 21A and the base material 11 are joined to each other. The base material 11 is a carbon porous material such as carbon paper or carbon cloth. Specifically, as shown in FIG. 4A and FIG. 4B, the rear end portion 21a of the first film 21A for conveyance is joined to the front end portion 11a of the base material 11 in the conveyance direction F. The front end portion 11a serves as an unwinding start part of the base material 11 that is wound into a roll shape.

In the embodiment, first of all, when the first film 21A and the base material 11 are superimposed on each other, the first film 21A and the base material 11 are adhered to each other through a first adhesive. Specifically, when the first film 21A and the base material 11 are superimposed on each other, the first film 21A and the base material 11 are adhered to each other through a first adhesive sheet 18A. The first adhesive is applied on both surfaces of the first adhesive sheet 18A. Thus, it is possible to superimpose the first film 21A and the base material 11 onto each other accurately before the first film 21A and the base material 11 are joined by staples 15A described later.

Here, a material of the first adhesive sheet 18A is not particularly limited as long as the material has flexibility and does not impair adhesiveness with the first adhesive. For example, the material of the first adhesive sheet 18A may include a resin sheet made from thermoplastic resin, and a metal sheet made from aluminum and so on. The first adhesive may be an adhesive or a pressure-sensitive adhesive that is made from thermoplastic resin such as acrylic resin and epoxy resin.

Next, the staples 15A (a first joining material) are made to penetrate a first overlapping portion 13A as well as the first adhesive sheet 18A, and the first film 21A and the base material 11 are thus joined to each other physically through the staples 15A. The first overlapping portion 13A is a portion where the first film 21A and the base material 11 are superimposed on each other. Hence, portions of the base material 11 and the first film 21A where the staples 15A penetrate are reinforced by the first adhesive sheet 18A.

Further, in the embodiment, the plurality of staples 15A is fixed on both sides of the first overlapping portion 13A so that the portions where the staples 15A penetrate are arrayed along the conveyance direction. The staples 15A are made from a metal material that has heat resistance during later-described drying and baking of the paste material, and also has corrosion resistance. The staples 15A are made from, for example, aluminum.

As described above, since the first film 21A and the base material 11 are joined to each other through the staples 15A, joining strength of the first film 21A and the base material 11 is enhanced further compared to a case where the first film 21A and the base material 11 are joined to each other only by adhesive tape, pressure-sensitive adhesive tape, or the like. As a result, even when a joining part of the first film 21A and the base material 11 is heated in the drying and baking part 35 in a state where tension is acting on the joining part, it is possible to prevent misalignment of the first film 21A and the base material 11. Thus, later-described coating of the conveyed base material 11 with the paste material, and drying and baking of the applied paste material can be performed in a stable manner.

Next, in step S3, unwinding of the base material 11 and winding of the first film 21A are started. The unwound base material 11 is led by the first film 21A, passes through the dust collector 38, and is conveyed to the coating part 34.

In step S4, in the coating part 34, the base material 11 is coated with the paste material discharged from the coating device 34a. The paste material may be any paste material as long as it contains conductive particles. Examples of the paste material include a material that is made into a paste after mixing carbon particles (the conductive particles) such as carbon black, water-repellent resin particles such as PTFE, and a surface active agent. The inspection camera 34b inspects a coating status (an impregnation status of the paste material) of the base material 11 coated with the paste material.

Next, in step S5, the conveyed base material 11 is conveyed to the drying and baking part 35. In the drying and baking part 35, while the base material 11 coated with the paste material is conveyed continuously, the paste material applied on the base material 11 is heated. Specifically, the paste material is heated as temperature of hot air blown from the nozzles 35a is adjusted based on temperature measured by the radiation thermometers 35b. Thus, the paste material is dried, and then baked, thereby forming the porous layer 12. In this way, the gas diffusion sheet 10 is manufactured. The step S5 is equivalent to "manufacturing of a gas diffusion sheet" of the disclosure.

Next, in step S6, the manufactured gas diffusion sheet 10 is conveyed to the inspection part 36. In the inspection part 36, when there is a defect portion based on an inspection result from the inspection cameras 36a, 36b, the printing device 36c prints on the base material 11.

The processes of step S4 to step S6 described above are continuously performed for the conveyed base material 11 while the winding roll 32 continuously winds the gas diffusion sheet 10. At a point when the rear end portion 11b of the base material 11 in the conveyance direction F, the rear end portion 11b serving as an unwinding end part of the base material 11, is positioned in the joining device 37, the base material 11 and the second film 21B are joined in step S7.

Figure 5A:
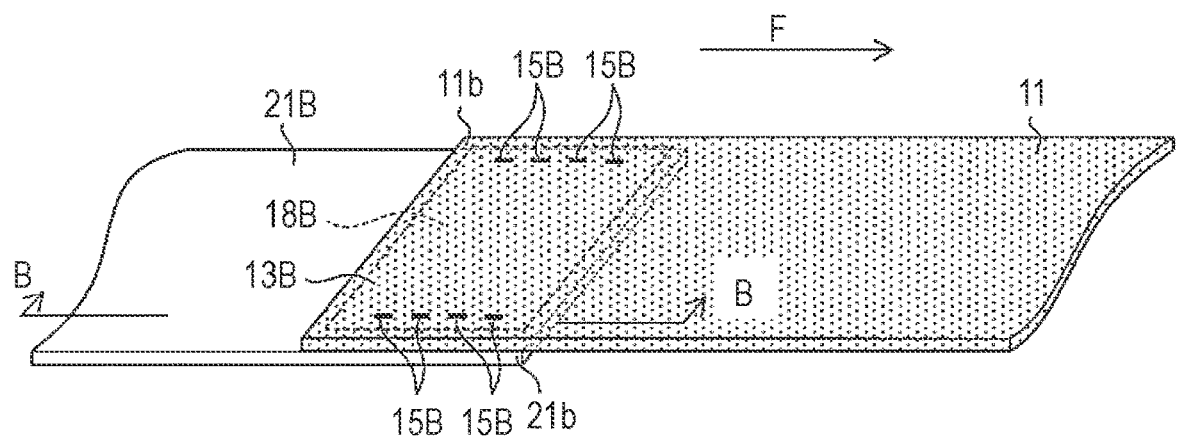
FIG. 5A is a view describing joining of a second film and the base material.
Figure 5B:
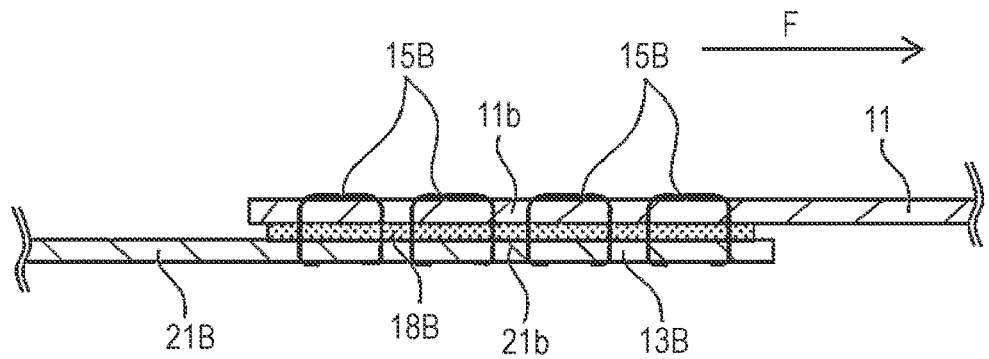
FIG. 5B is a sectional view taken along arrows B-B in FIG. 5A.

Specifically, as shown in FIG. 5A and FIG. 5B, a front end portion 21b of the second film 21B for conveyance is joined to the rear end portion 11b of the base material 11 in the conveyance direction F. The rear end portion 11b serves as the unwinding end part of the base material 11 that is wound in a roll shape.

In the embodiment, first of all, similarly to the case described in step S2, when the base material 11 and the second film 21B are superimposed on each other, the base material 11 and the second film 21B are adhered to each other through a second adhesive. Specifically, when the base material 11 and the second film 21B are superimposed on each other, the base material 11 and the second film 21B are adhered to each other through a second adhesive sheet 18B. The second adhesive is applied on both surfaces of the second adhesive sheet 18B. Here, materials of the second adhesive sheet 18B and the second adhesive are the same as the materials of the first adhesive sheet 18A and the first adhesive described as examples, respectively.

Next, staples 15B (a second joining material) are made to penetrate a second overlapping portion 13B as well as the second adhesive sheet 18B so that the base material 11 and the second film 21B are joined to each other physically through the staples 15B. The second overlapping portion 13B is a portion where the base material 11 and the second film 21B are superimposed on each other. Thus, portions of the base material 11 and the second film 21B where the staples 15B penetrate are reinforced by the second adhesive sheet 18B.

Further, in the embodiment, the plurality of staples 15B is fixed on both sides of the second overlapping portion 13B so that the portions where the staples 15B penetrate are arrayed along the conveyance direction. The staples 15B are made from a material similar to that of the staples 15A described as an example.

As described above, as the staples 15B penetrate the second overlapping portion 13B in which the base material 11 and the second film 21B are superimposed on each other, the second film 21B and the base material 11 are physically joined to each other through the staples 15B. Thus, joining strength of the base material 11 and the second film 21B is enhanced further compared to a case where the base material 11 and the second film 21B are joined to each other only by adhesive tape, pressure-sensitive adhesive tape, or the like.

As a result, even when a joining part of the base material 11 and the second film 21B is heated in the drying and baking part 35 in a state where tension is acting on the joining part, it is possible to prevent misalignment of the base material 11 and the second film 21B. Thus, in a part of the base material 11 in front of the joining part where the base material 11 and the second film 21B are joined to each other, coating with the paste material, and drying of the applied paste material are performed in a stable manner.

Thus, after the first film 21A is wound by the roll-to-roll method, the gas diffusion sheet 10 joined to the first film 21A is wound, and then the second film 21B joined to the gas diffusion sheet 10 is wound. Accordingly, a series of winding is completed (step S8).

In the embodiment, the first film 21A and the base material 11 are joined, and the base material 11 and the second film 21B are joined by the staples 15A, 15B, respectively. However, as shown in, for example, a modification in FIG. 6A to FIG. 7B, the first film 21A and the base material 11 may be sewn on each other, and the base material 11 and the second film 21B may be sewn on each other by continuous fibers 15C, 15D such as carbon fibers, respectively.

Specifically, in step S2 described earlier, as shown in FIG. 6A and FIG. 6B, the rear end portion 21a of the first film 21A for conveyance and the front end portion 11a of the base material 11 in the conveyance direction F are adhered to each other through the first adhesive sheet 18A having the first adhesive applied on both surfaces.

Next, the continuous fiber 15C (the first joining material) is made to penetrate the first overlapping portion 13A as well as the first adhesive sheet 18A with given pitch. The first overlapping portion 13A is a portion where the first film 21A and the base material 11 are superimposed on each other. Thus, the first film 21A and the base material 11 are physically joined to each other through the continuous fiber 15C. In the modification, both sides of the first overlapping portion 13A are sewn by the continuous fiber 15C so that the portions where the continuous fiber 15C passes through are arrayed along the conveyance direction F.

Figure 7A:
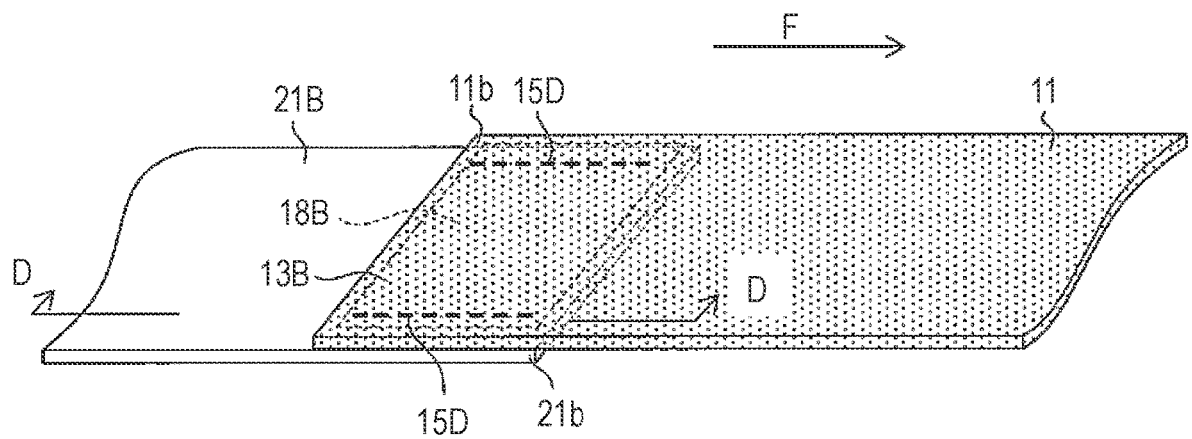
FIG. 7A is a view describing joining of the second film and the base material according to the modification.
Figure 7B:
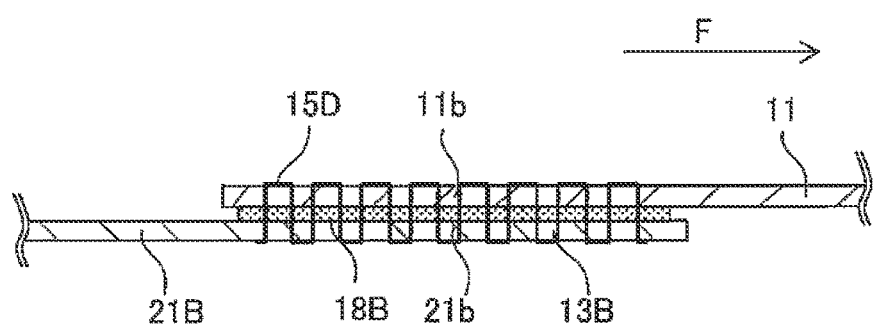
FIG. 7B is a sectional view taken along arrows D-D in FIG. 7A.
Figure 8A:
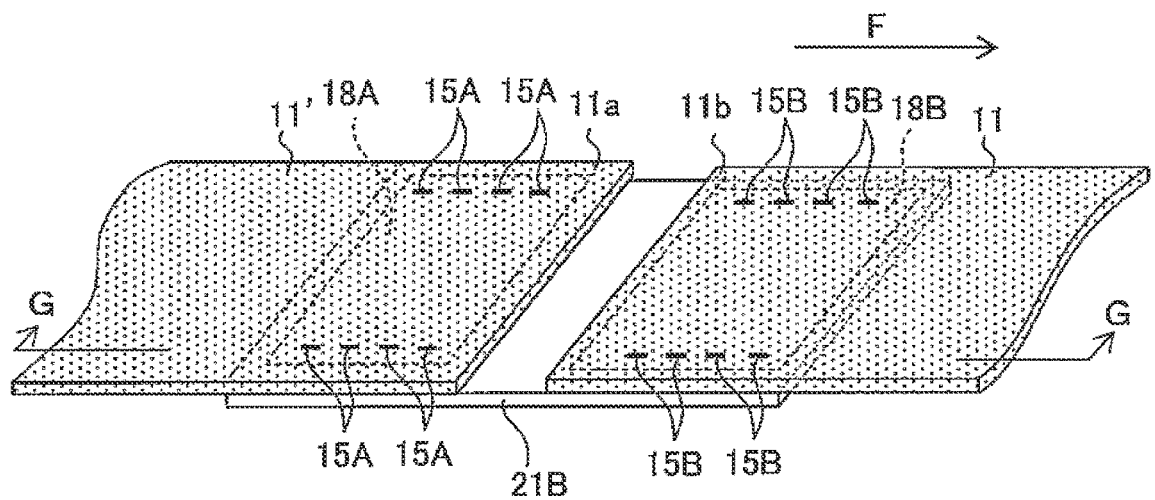
FIG. 8A is a view describing joining of the second film and the base material according to another modification.
Figure 8B:
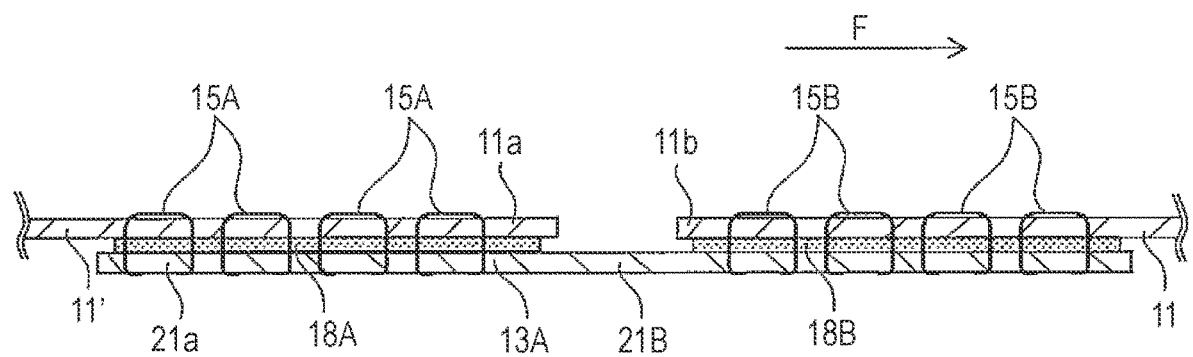
FIG. 8B is a sectional view taken along arrows G-G in FIG. 8A.

Further, similarly to step S7, as shown in FIG. 7A and FIG. 7B, the rear end portion 11b of the base material 11 in the conveyance direction F and the front end portion 21b of the second film 21B for conveyance are adhered to each other through the second adhesive sheet 18B having the second adhesive applied on both surfaces.

Next, the continuous fiber 15D (the second joining material) is made to penetrate the second overlapping portion 13B as well as the second adhesive sheet 18B with given pitch. The second overlapping portion 13B is a portion where the base material 11 and the second film 21B are superimposed on each other. Thus, the second film 21B and the base material 11 are physically joined to each other through the continuous fiber 15D. In the modification, both sides of the second overlapping portion 13B are sewn by the continuous fiber 15D so that the portions where the continuous fiber 15D passes through are arrayed along the conveyance direction F.

In the embodiment, the second film 21B is wound after the base material 11 and the second film 21B are joined to each other. However, for example, as shown in a modification in FIG. 8A and FIG. 8B, a base material 11' to be connected with the second film 21B may be prepared, and a front distal end of the base material 11' in the conveyance direction F and the second film 21B may be joined to each other by the same method described in step S2.

Figure 9:
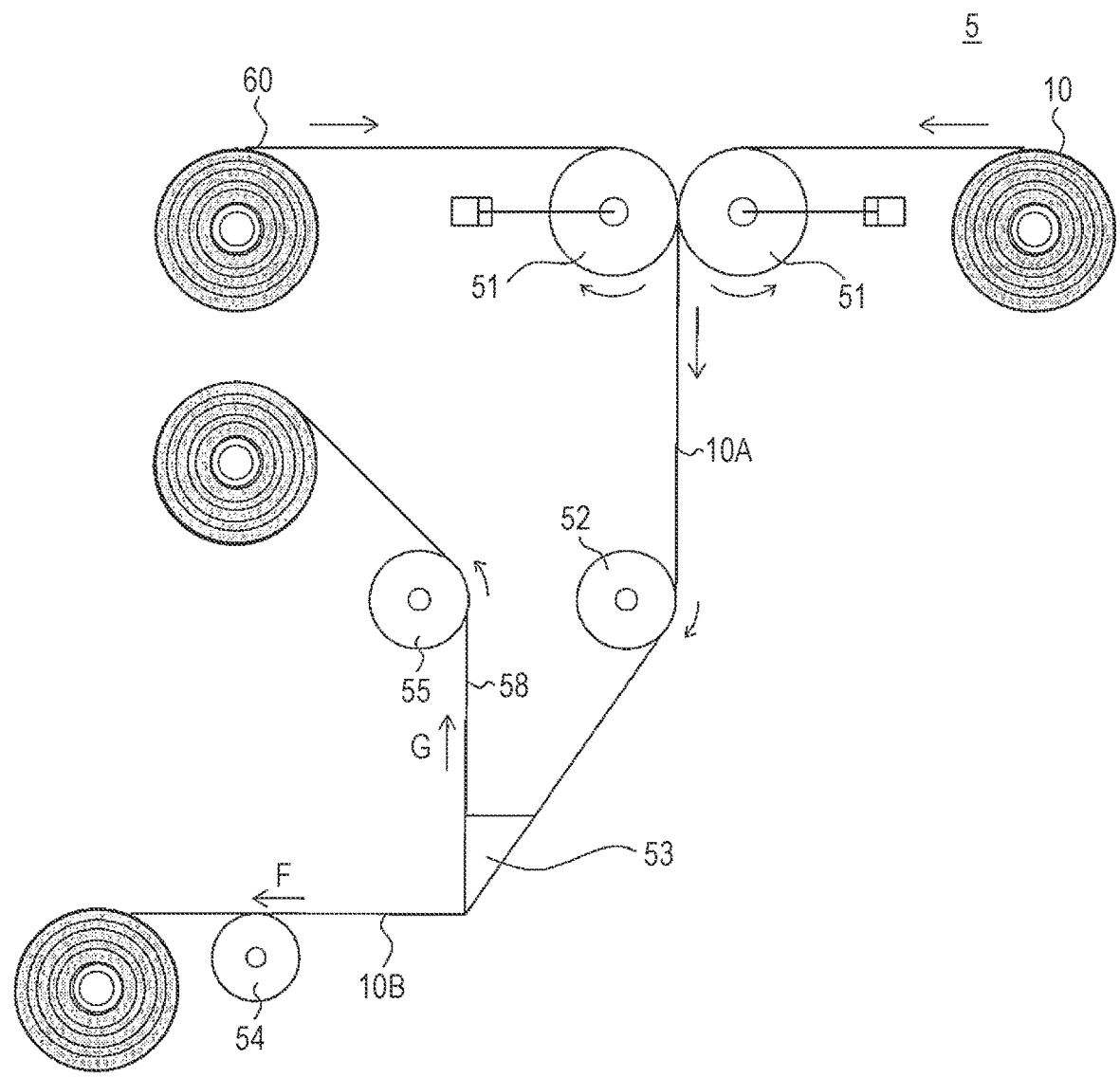
FIG. 9 is a view describing joining of an electrolyte sheet on which a catalyst layer is formed, and the gas diffusion sheet.

With the gas diffusion sheet 10 thus obtained, a composite sheet 10B is manufactured by using a joining device 5 shown in FIG. 9. The second film 21B that is unwound first is made to pass along a conveyance path of the joining device 5, and the porous layer of the gas diffusion sheet 10, and the anode-side catalyst layer formed on an electrolyte sheet 60 that serves as an electrolyte film of a fuel cell are joined to each other by hot press performed by heat-pressure rolls 51.

Further, the composite sheet 10A that has passed a conveying roll 52 passes through a peeling bar 53, and a back sheet 58 stuck on a back surface of the electrolyte sheet 60 is peeled off from the composite sheet 10A by the peeling bar 53. The back sheet 58 passes through a conveying roll 55 and is wound into a roll shape. Meanwhile, the composite sheet 10B from which the back sheet 58 is peeled off passes through a conveying roll 54 and is wound in a roll shape.

Thereafter, the composite sheet 10B wound into the roll shape is unwound from the first film, and the cathode-side catalyst layer is formed further on the electrolyte sheet, and then cut into a given shape. In this case, the first and second films 21A, 21B are cut off together with the parts joined to the base material 11, and discarded.

Hereinafter, examples of the disclosure are described.

Example 1

First of all, a base material (carbon paper) with a width of 300 mm, and a first film (Kapton (registered trademark) tape manufactured by Du Pont-Toray Co., Ltd.) having the same width were prepared. Then, the base material and the first film were superimposed on and adhered to each other through a first adhesive sheet (with a width of 250 mm, and a length of 100 mm). An adhesive was applied on both surfaces of the first adhesive sheet.

Next, as shown in FIG. 4A and FIG. 4B, four aluminum staples were fixed on each side of a first overlapping portion, thereby making it eight staples in total on both sides, at intervals of 15 mm so that the staples were made to penetrate the base material and the first film as well as the first adhesive sheet. In each of the staples, a distance between distal ends on both sides was 10 mm. Thus, a test material according to example 1 was fabricated.

Example 2

Figure 6A:
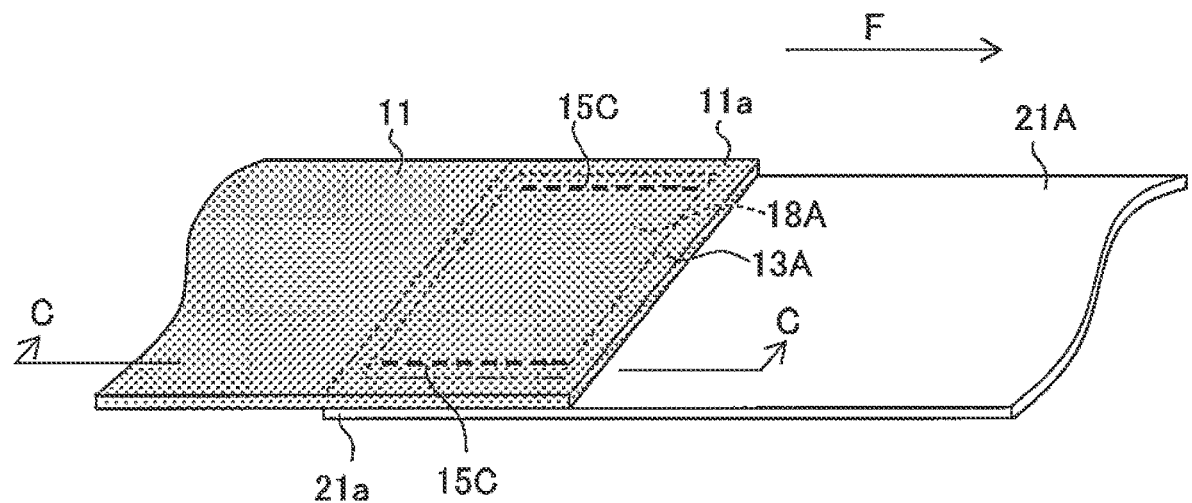
FIG. 6A is a view describing joining of the first film and the base material according to a modification.
Figure 6B:
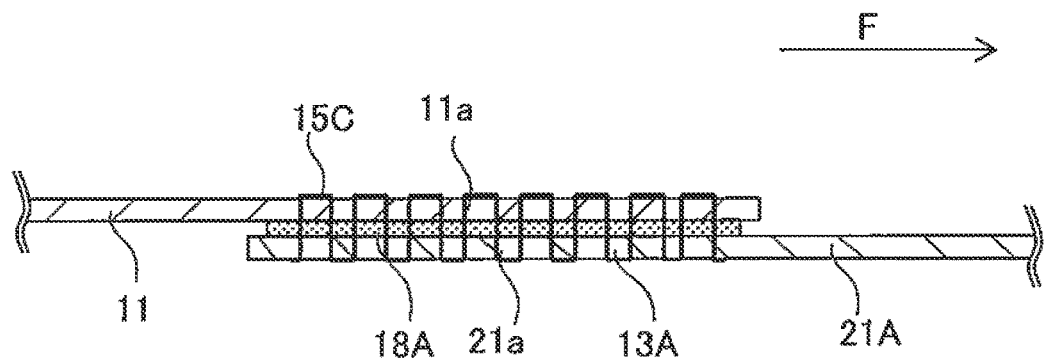
FIG. 6B is a sectional view taken along arrows C-C in FIG. 6A.

A test material was fabricated similarly to example 1. As shown in FIG. 6A and FIG. 6B, a difference from example 1 is that a carbon fiber was used instead of the staples to sew both sides of the base material and the first film along a conveyance direction with a pitch of 10 mm and a length of 80 mm so that the carbon fiber passes through the base material and the first film as well as the first adhesive sheet.

Comparative Example 1

Figure 10:
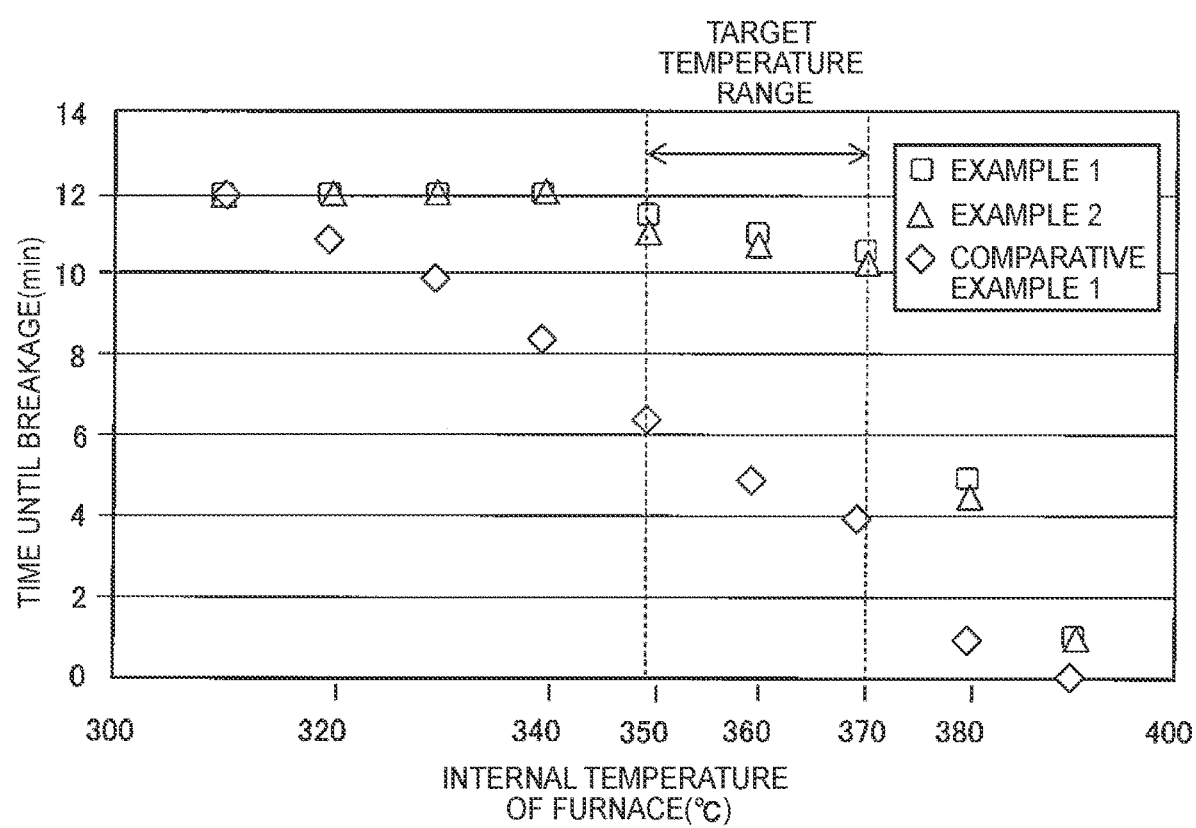
FIG. 10 is a graph showing a relation between heating temperature and breakage time of test materials according to examples 1, 2 and comparative example 1.

A test material was fabricated similarly to example 1. A difference from example 1 is that the joining is not done by the staples Strength Test The test materials of examples 1, 2 and comparative example 1 were heated in a furnace in a state where tension was acting on each of the test materials in a direction in which the base material and the first film are separated from each other, and time was measured until each of the test materials was broken. The results are shown in FIG. 10.

As a result, the test materials of example 1 and example 2 took longer than the test material of comparative example 1 until they were broken in a target temperature range from 350° C. to 370° C. that matches drying temperature of a paste material. It is considered that breakage time of the test material of comparative example 1 is shorter than those of the test materials of example 1 and example 2 because adhesive strength (pressure-sensitive adhesive strength) is deteriorated by the adhesive in that temperature range.

The embodiment according to the disclosure has been described in detail. However, the disclosure is not limited to the foregoing embodiment, and various design changes may be made without departing from the spirit of the disclosure described in claims.

What is claimed is:

1. A manufacturing method for a gas diffusion sheet of a fuel cell in which a porous layer containing a conductive particle is formed on a conductive belt-shaped base material while the base material is conveyed by a roll-to-roll method, the manufacturing method comprising:
joining a first film for conveyance to a front end portion of the base material in a conveyance direction, the front end portion serving as an unwinding start part of the base material that is wound in a roll shape;
guiding the base material while the base material is conveyed as the first film is conveyed by the roll-to-roll method, and coating a surface of the base material with a paste material that contains at least the conductive particle;
manufacturing the gas diffusion sheet as the porous layer is formed as the paste material applied is heated while the base material coated with the paste material is continuously conveyed; and
joining a second film for conveyance to a rear end portion of the base material in the conveyance direction, the rear end portion serving as an unwinding end part of the base material, wherein:
after the first film is wound, the gas diffusion sheet joined to the first film is wound, and further, the second film joined to the gas diffusion sheet is wound;
for joining of the first film, a first joining material is made to penetrate a first overlapping portion where the first film and the base material are superimposed on each other, and the first film and the base material are thus physically joined to each other through the first joining material; and
for joining of the second film, a second joining material is made to penetrate a second overlapping portion where the base material and the second film are superimposed on each other, and the second film and the base material are thus physically joined to each other through the second joining material;
wherein the first joining material penetrates are arranged along both sides of the first overlapping portion and the first joining material penetrates for each side are arrayed in the conveyance direction, and the second joining material penetrates are arranged along both sides of the second overlapping portion and the second joining material penetrates for each side are arrayed in the conveyance direction.

2. The manufacturing method according to claim 1, wherein;
the first film and the base material are adhered to each other through a first adhesive when the first film and the base material are superimposed on each other so as to join the first film; and
the base material and the second film are adhered to each other through a second adhesive when the base material and the second film are superimposed on each other so as to join the second film.

3. The manufacturing method according to claim 2, wherein;
the first film and the base material are adhered to each other through a first adhesive sheet when the first film and the base material are superimposed on each other so as to join the first film, the first adhesive sheet having the first adhesive applied on both surfaces of the first adhesive sheet, and then the first joining material is made to penetrate the first overlapping portion as well as the first adhesive sheet so that the first film and the base material are joined to each other; and
the base material and the second film are adhered to each other through a second adhesive sheet when the base material and the second film are superimposed on each other so as to join the second film, the second adhesive sheet having the second adhesive applied on both surfaces of the second adhesive sheet, and then the second joining material is made to penetrate the second overlapping portion as well as the second adhesive sheet so that the second film and the base material are joined to each other.

4. The manufacturing method for a gas diffusion sheet of a fuel cell of claim 1, wherein the first joining material is made to penetrate the first overlapping portion with a predetermined pitch.

5. The manufacturing method for a gas diffusion sheet of a fuel cell of claim 1, wherein a plurality of the first joining material is fixed on both sides of the first overlapping portion so that the portions where the first joining material penetrates are arranged along the conveyance direction, and a plurality of the second joining material is fixed on both sides of the second overlapping portion so that the portions where the second joining material penetrates are arranged along the conveyance direction.

6. The manufacturing method for a gas diffusion sheet of a fuel cell of claim 5, wherein the first joining material and the second joining material are made from a metal material.

7. The manufacturing method for a gas diffusion sheet of a fuel cell of claim 1, wherein both sides of the first overlapping portion are sewn by the first joining material so that the portions where the first joining material passes through are arrayed along the conveyance direction, and both sides of the second overlapping portion are sewn by the second joining material so that the portions where the second joining material passes through are arrayed along the conveyance direction.

8. The manufacturing method for a gas diffusion sheet of a fuel cell of claim 7, wherein the first joining material and the second joining material are made from continuous fiber.

9. The manufacturing method according to claim 1, wherein the first joining material is fixed on both sides of the first overlapping portion, and the second joining material is fixed on both sides of the second overlapping portion.

* * * * *